US006144915A

United States Patent [19]

Shiomi et al.

[11] Patent Number: 6,144,915

[45] Date of Patent: Nov. 7, 2000

[54] AERODROME CONTROL SUPPORT SYSTEM

[75] Inventors: Kakuichi Shiomi, Kokubunji; Etsuko Oda; Seiichiro Tanaka, both of Kawasaki; Keiichiro Nakaue, Yokohama, all of Japan

[73] Assignees: Director-General, Ship Research Institute, Ministry of Trans, Tokyo; Kabushiki Kaisha Toshiba, Kawasaki; Oki Electric Industry Co., Ltd., Tokyo, all of Japan

[21] Appl. No.: 09/047,310

[22] Filed: Mar. 25, 1998

[30] Foreign Application Priority Data

Mar. 26, 1997 [JP] Japan .................................... 9-073535

[51] Int. Cl.[7] .................................................. G06F 163/00

[52] U.S. Cl. ........................... 701/120; 701/301; 342/36; 342/455; 342/456; 340/961

[58] Field of Search ............................... 701/15, 16, 120, 701/121, 122, 300, 301; 340/435, 903, 961; 342/29, 36–38, 454, 455, 456; 73/178 T

[56] References Cited

U.S. PATENT DOCUMENTS

| | | | |
|---|---|---|---|
| 5,375,058 | 12/1994 | Bass | 701/120 |
| 5,469,371 | 11/1995 | Bass | 701/120 |
| 5,493,309 | 2/1996 | Bjornholt | 701/301 |
| 5,519,618 | 5/1996 | Kastner et al. | 701/301 |
| 5,548,515 | 8/1996 | Pilley et al. | 701/120 |
| 5,574,648 | 11/1996 | Pilley | 701/120 |
| 5,629,691 | 5/1997 | Jain | 701/120 |
| 5,740,047 | 4/1998 | Pilley et al. | 701/301 |
| 5,890,079 | 3/1999 | Levine | 701/301 |
| 5,892,462 | 4/1999 | Tran | 701/301 |

FOREIGN PATENT DOCUMENTS

| | | |
|---|---|---|
| 2-96900 | 4/1990 | Japan . |
| 2-181900 | 7/1990 | Japan . |
| 2-208800 | 8/1990 | Japan . |
| 2-287800 | 11/1990 | Japan . |
| 3-260800 | 11/1991 | Japan . |
| 4-49500 | 2/1992 | Japan . |
| 5-166100 | 7/1993 | Japan . |
| 8-72799 | 3/1996 | Japan . |
| 9-043626 | 2/1997 | Japan . |

*Primary Examiner*—Gary Chin
*Attorney, Agent, or Firm*—Oblon, Spivak, McClelland, Maier & Neustadt, P.C.

[57] ABSTRACT

In a path determining section, an optimum path is calculated based on detection/storage information of a position detector, airport surface information storage section, aircraft information storage section and knowledge information storage section according to an instruction request from a request information input section of an aircraft and is indicated by a path indicator of the aircraft. Further, a collision determining section calculates the possibility of collision on the optimum path obtained in the path determining section according to the coordinates and traveling directions of all of the aircraft based on the above detection/storage information and a warning is indicated by a warning indicator of the aircraft. Further, a control operation determining section monitors the maneuvering control operation on the aircraft side, determines whether or not the maneuvering control operation is erroneous by referring to the optimum path and the possibility of collision, and if it is determined that the maneuvering control operation is erroneous, the control operation is left to the automatic control section and the aircraft is decelerated or stopped. As a result, it becomes possible to efficiently and safely guide the aircraft to a target point according to the request.

8 Claims, 11 Drawing Sheets

AERODROME CONTROL SUPPORT SYSTEM

BACKGROUND OF THE INVENTION

This invention relates to an aerodrome control support system for supporting the control operation for guiding aircraft in an aerodrome.

In the present aerodrome control, the controller individually observes the aircraft and issues an individual instruction. Particularly, the communication between the controller and the aircraft is made by use of radio waves and each controller uses one fixed frequency. Therefore, the number of aircraft to which the controller can respond at one time is limited to one and the controller in charge cannot respond to another aircraft even if the other aircraft requests an instruction. In such a case, the aircraft must wait until the controller gives a response.

Thus, in the conventional aerodrome control, since the control instruction cannot always be timely issued, there occurs a problem that the operation efficiency is low and an adequate instruction cannot be instantaneously issued.

BRIEF SUMMARY OF THE INVENTION

In the conventional aerodrome control described above, since the control instruction cannot always be timely issued, there occurs a problem that the operation efficiency is low and an adequate instruction cannot be instantaneously issued.

An object of this invention is to solve the above problem and provide an aerodrome control support system which timely gives information for navigation at a good timing required by the pilot to efficiently operate the aircraft and which can automatically determine that the aircraft is set in a dangerous course and stably stop or decelerate the aircraft without fail.

In order to attain the above object, this invention is constructed as follows.

(1) An aerodrome control support system for supporting air traffic control in an airport surface comprises a position detector for detecting position information of all of aircraft using the airport; an airport surface information storage section for storing airport surface information containing main coordinates of the air port; an aircraft information storage section for previously storing main type information of all of aircraft using the airport as aircraft information; a path determining section for selectively deriving necessary information from the position detector, airport surface information storage section and aircraft information storage section to determine an optimum path; and a path indicator mounted on the aircraft, for indicating the optimum path determined by the path determining section.

(2) The aerodrome control support system of (1) further comprises a collision determining section for selectively deriving necessary information from the position detector, airport surface information storage section and aircraft information storage section and always derives the possibility of collision during the movement of the aircraft along a path which is a candidate determined by the path determining section based on the coordinates and traveling directions of all of the aircraft to determine a navigation method which each aircraft takes; and a warning indicator mounted on the aircraft, for recognizing the possibility of collision determined by the collision determining section and indicating the warning.

(3) The aerodrome control support system of (2) further comprises a control operation determining section for monitoring the maneuvering control operation on the aircraft side and referring to information of the possibility of collision determined by the collision determining section and the optimum path determined by the path determining section to determine whether or not the maneuvering control operation is erroneous; an automatic control section for decelerating or stopping the aircraft when the control operation determining section determines that the maneuvering control operation is erroneous; and a control information display section for displaying the operation state of the aircraft, information input by a pilot and information of the possibility of collision and path indicating information with respect to the aircraft for recognition.

(4) In the aerodrome control support system of (1), the path determining section determines the optimum path by representing the airport surface in a graph form and effecting a searching operation on the graph.

(5) In the aerodrome control support system of (1), the path determining section determines the optimum path by inference based on a previously determined production rule.

(6) In the aerodrome control support system of (2), the collision determining section receives the coordinates and travelling directions of two aircraft as inputs, derives the distance between the two aircraft and determines that there occurs a possibility of collision when the distance is shorter than a reference value and the travelling directions thereof are opposite.

(7) In the aerodrome control support system of (2), the path determining section determines the optimum path by representing the airport surface in a graph form and effecting the searching operation on the graph; and the collision determining section determines that there occurs a possibility of collision based on the cost of the graph created by the path determining section.

(8) The aerodrome control support system of (2) further comprises a request information input section mounted on the aircraft, for inputting an instruction request associated with guidance of the airport surface and the collision determining section and path determining section transmit information of the possibility of collision and the optimum path to the aircraft side in response to a request from the request information inputting section.

(9) The aerodrome control support system of (2) further comprises a knowledge information storage section for storing knowledge information related to the collision determining section for selectively deriving necessary information from the position detector, airport surface information storage section and aircraft information storage section and determining a safe traveling method which the aircraft takes and calculating the possibility of collision on the optimum path determined by the path determining section based on the coordinates and travelling directions of all of the aircraft; and a knowledge input section for inputting knowledge information into the knowledge information storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, in which.

DETAILED DESCRIPTION OF THE INVENTION

There will now be described an embodiment of this invention with reference to the accompanying drawings.

Figure 1:
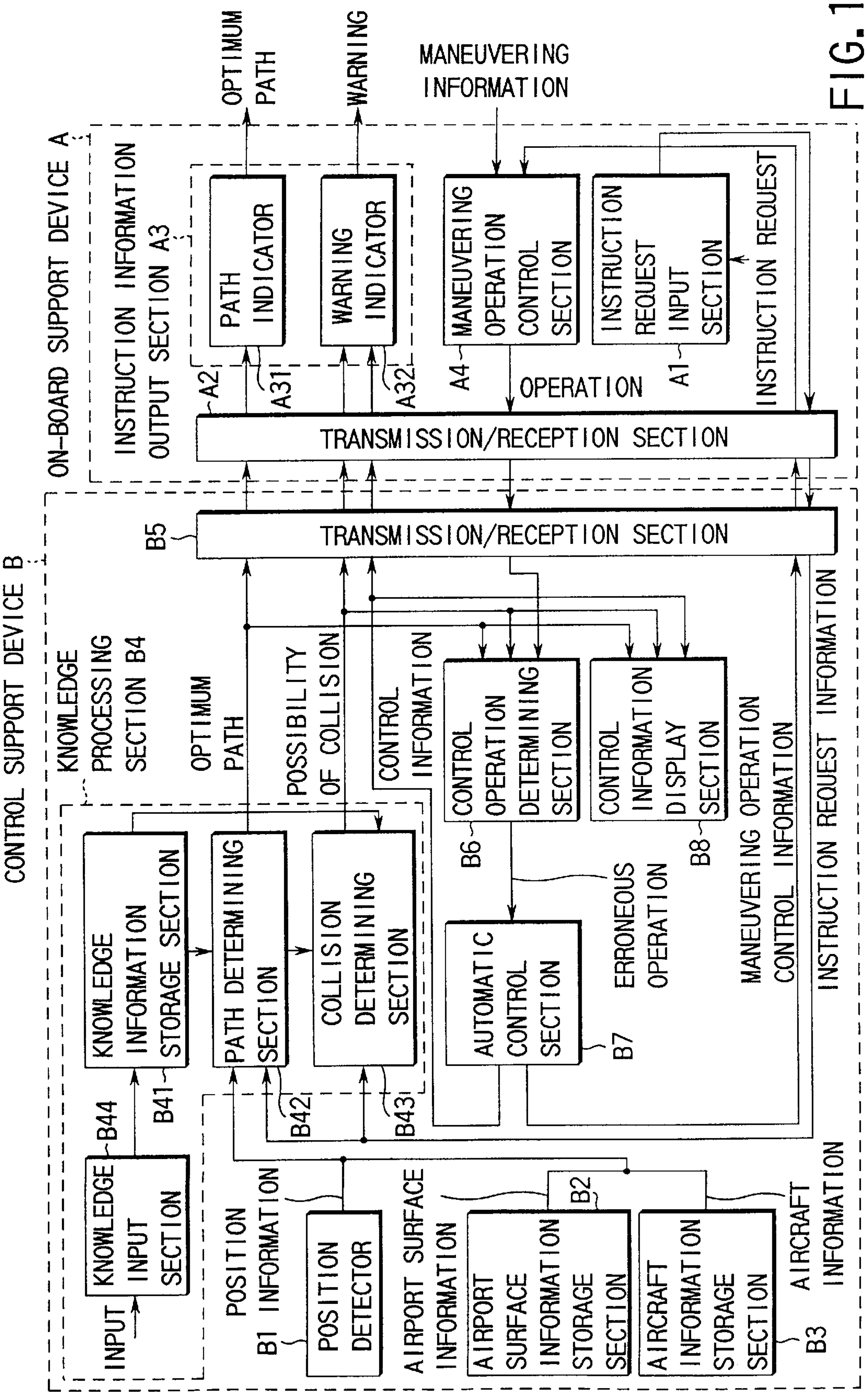
FIG. 1 is a block diagram showing the whole construction of one embodiment of an aerodrome control support system according to this invention.

FIG. 1 shows the whole construction of an aerodrome control support system according to this invention.

The system is roughly divided into an on-board support device A mounted on the aircraft and a control support device B arranged on the control facility side.

The on-board support device A includes a request information input section A1, transmission/reception section A2, instruction information output section A3 and maneuvering operation control section A4.

The request information input section A1 is to input instruction information (which is hereinafter referred to as instruction request information) requested by the pilot with respect to the control side, and for example, it converts instruction request information input by the maneuvering operation or utterance of the pilot into information which meets the representation in the system by use of a touch panel, keyboard, mouse, track ball, microphone or the like attached to the display. The input information is transmitted to the control support device B via the transmission/reception section A2 as an instruction output request.

The instruction information output section A3 includes a path indicator A31 and warning indicator A32, and gives outputs of the system transmitted from the control support device B via the transmission/reception section A2, that is, an optimum path and warning to the pilot, and it converts information from the control support device B into a representation which the pilot can easily understand and outputs the same to the display and warning device.

The path indicator A31 receives optimum path information determined by the control support device B and adequately displays the path on the display (not shown) or the like. Further, the warning indicator A32 receives a warning and control information obtained from the control support device B and converts the same into a representation of GUI (Graphical User Interface), voice or the like which can be easily understood by the pilot.

The maneuvering operation control section A4 controls the traveling operation of the aircraft according to maneuvering operation control information transmitted from the control support device B via the transmission/reception section A2 and maneuvering information of the pilot. The operating information is transmitted to the control support device B via the transmission/reception section A2.

The control support device B includes a position detector B1, airport surface information storage section B2, and aircraft information storage section B3.

The position detector B1 detects position information (flight names, coordinates, directions) of all of the aircraft using the airport by use of GPS or the like. The airport surface information storage section B2 previously stores information (for example, main coordinates of the airport surface) of the airport surface and outputs corresponding stored information periodically or at each time of an output request. The aircraft information storage section B3 previously stores information (differences according to the types) of the aircraft in the airport surface or at the departure or arrival and outputs stored information periodically (or at each time of a output request).

The position detector B1, airport surface information storage section B2 and aircraft information storage section B3 update position information and storage information when new information is input. The position information, airport surface information and aircraft information are transmitted to a knowledge processing section B4. Further, the knowledge processing section B4 is supplied with an instruction output request transmitted from the transmission/reception section A2 of the on-board support device A via the transmission/reception section B5.

The knowledge processing section B4 receives the position information, airport surface information, aircraft information and instruction request information from the aircraft as inputs to determine the optimum path and the possibility of collision of each aircraft and includes a knowledge information storage section B41, path determining section B42, collision determining section B43, and knowledge input section B44.

The knowledge information storage section B41 stores knowledge information such as weighting parameters and rules necessary for path determination input via the knowledge input section B44.

The path determining section B42 receives the position information, airport surface information, aircraft information and instruction output request information from the aircraft, calculates optimum paths of the respective aircraft based on the rules and parameter information stored in the knowledge information storage section B41, and transmits the same to the path indicator A31 of the on-board support device A via the transmission/reception section B5. In this case, when an obstacle is detected in the path at the time of calculation for the optimum path, obstacle information is output to the collision determining section B43.

The collision determining section B43 receives obstacle information from the path determining section B42 and instruction request information from the aircraft, calculates and determines the possibility of collision of all of the aircraft and transmits the same to the warning indicator A32 of the on-board support device A via the transmission/reception section B5.

Further, the optimum path information and possibility-of-collision information obtained in the path determining section B42 and collision determining section B43 are transmitted to a control operation determining section B6 together with control operation information of the maneuvering operation control section A4 in the on-board support device A transmitted via the transmission/reception section B5.

The control operation determining section B6 determines whether or not the maneuvering control operation for the aircraft is adequate based on various information such as the optimum path and the possibility of collision, and if an erroneous control operation occurs, erroneous operation information is transmitted to an automatic control section B7 and the process is left to the automatic control.

When the automatic control section B7 receives erroneous operation information from the control operation determining section B6, it transmits suitable maneuvering control information to the maneuvering operation control section A4 of the on-board support device A via the transmission/reception section B5 and transmits the control information therefor to the warning indicator A32 to inform the pilot of this situation.

A control display section B8 displays the operation state of the aircraft transmitted or received via the transmission/reception section B5, information input by the pilot and path indicating information and possibility-of-collision information for the aircraft.

Figure 8A:
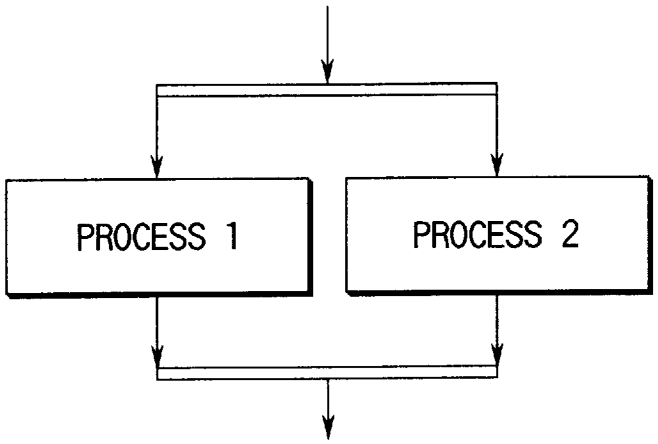
FIGS. 8A, 8B, 8C are flowcharts for illustrating the way of looking at the flowcharts shown in FIGS. 2 to 7.
Figure 8B:
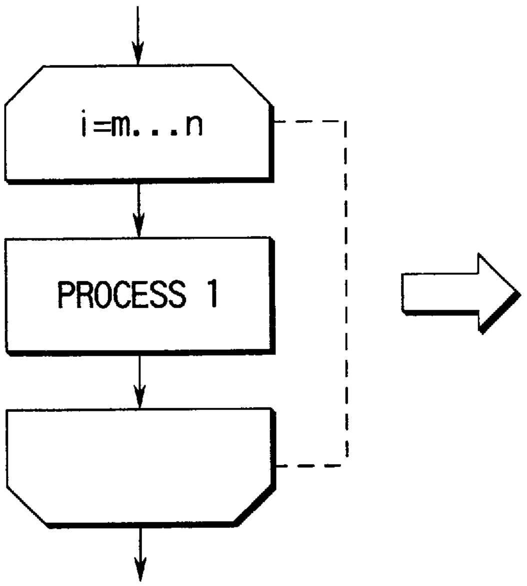
Figure 8C:
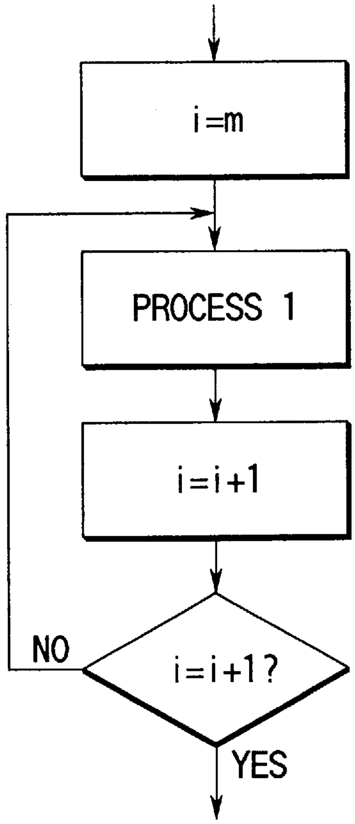

With the above construction, the processing contents of the functional blocks are explained with reference to the flowcharts shown in FIGS. 2 to 7. In FIGS. 2 to 7, for example, the parallel process of the process 1 and the process 2 is represented as in FIG. 8A and the repetition process of (n-m) times of the process 1 is represented as in FIG. 8B (the process 1 and process 2 indicate a desired process, determination, and repetition). That is, the processing content of FIG. 8A is equivalent to the flow shown in FIG. 8C.

First, as an input method of the request information input section 11 of the on-board support device A, a voice input method or image plane selective input method is considered, for example.

When an input is made by use of voice, the content of an utterance of the pilot is analyzed by use of a speech recognition apparatus and the result of the analysis is used as input information. In this case, the content of the utterance of the pilot is displayed on the display for recognition. Further, when a selective input is made on the display, candidates of the utterance are displayed on the display so that the pilot can select one of them. Of course, both of the above two methods can be combined.

Figure 2:
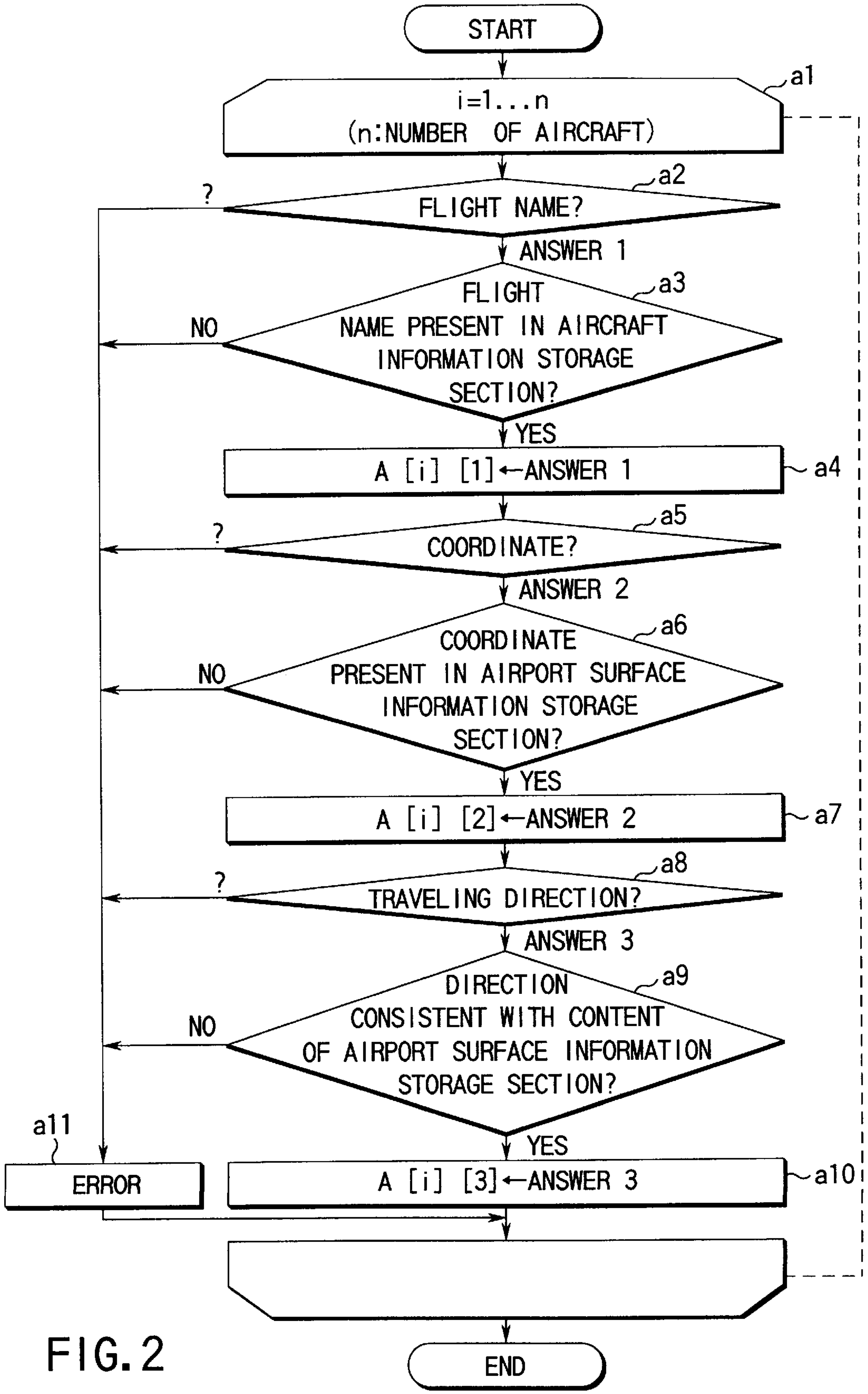
FIG. 2 is a flowchart for illustrating the process of a position detector in the same embodiment.

In the control support device B, position information is detected in the position detecting section B1 by the procedure as shown in FIG. 2, for example.

In FIG. 2, first, the number i (i=1 to n: n is the number of aircraft) is assigned to a desired aircraft (step a1), a flight name (answer 1) is recognized (step a2), whether or not the flight name is present in the aircraft information storage section B3 is determined (step a3), and the flight name is fetched (step a4) if it is present.

Then, the coordinate (answer 2) of the aircraft i is fetched by use of a GPS system or the like (step a5), whether or not the coordinate is present in the airport surface storage section B2 is determined (step a6), and the coordinate is fetched if it is present (step a7).

Further, the traveling direction (answer 3) of the aircraft i is recognized (step a8), whether or not the direction is consistent with the stored information of the airport surface information storage section B2 (step a9), and information of the traveling direction is fetched if there is no inconsistency (step a10).

If there is no result in the above steps a2, a3, a5, a6, a8, a9, position information of the aircraft i is registered as an error (step a11). After this, the process of the steps al to all is repeatedly effected to detect the position information of the n aircraft.

Next, an example in which the path determining section B42 and collision determining section B43 of the knowledge processing section B4 are realized by use of software on the computer is explained.

First, a case wherein a path is determined by searching an airport surface which is made in a graph form in the path determining section B42 is explained.

The following example is considered as the function thereof.

Figure 9:
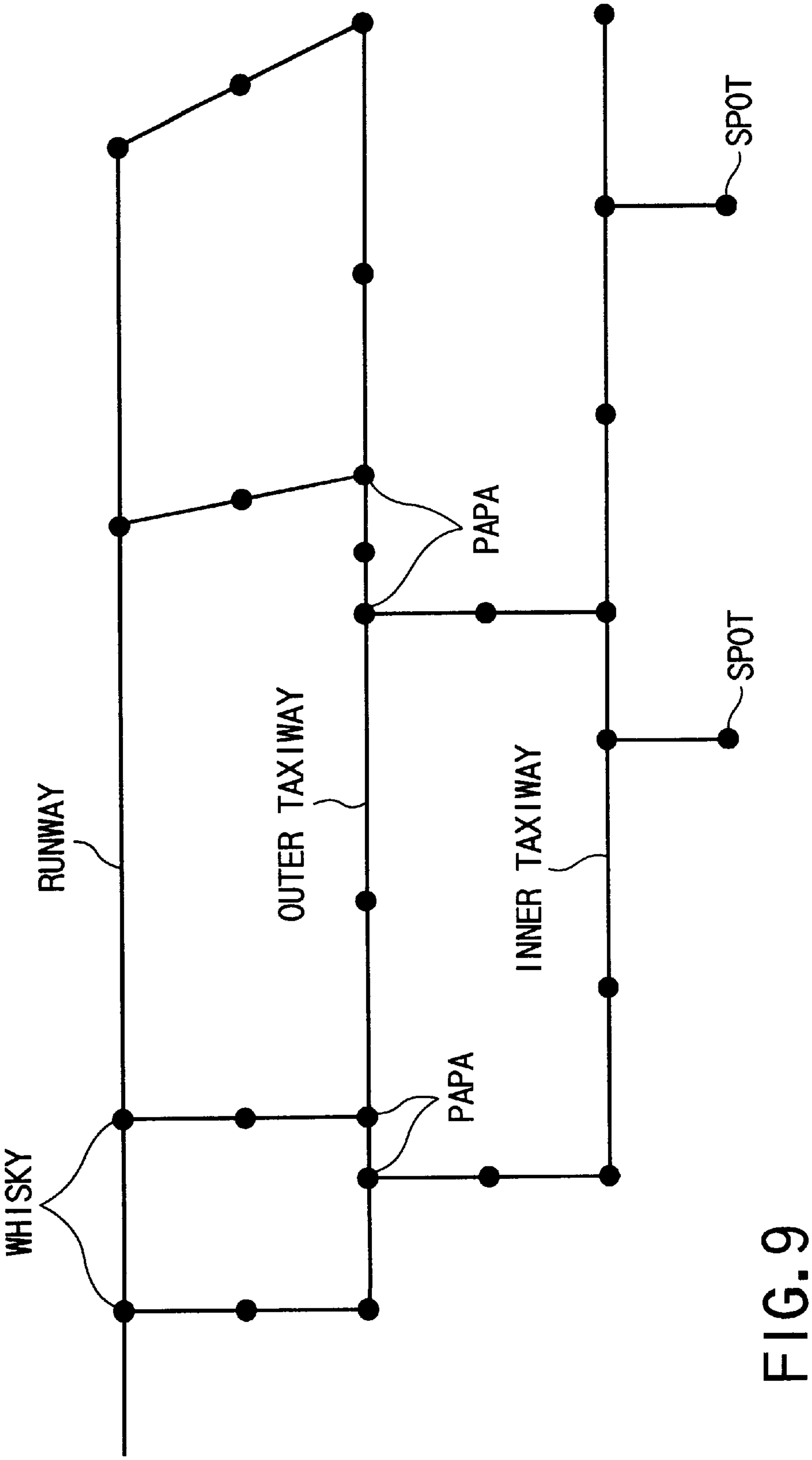
FIG. 9 is a diagram showing an example of an airport surface graph of the same embodiment.

The airport surface is represented by a non-directed graph as shown in FIG. 9. In the non-directed graph, apexes are desired points on the airport surface containing points at which the paths of the airport surface cross. Sides connecting the apexes are the paths of the airport surface and weighted in both directions. The graph is individually weighted for each aircraft and a path of lowest cost is selected by width priority searching.

Figure 10:
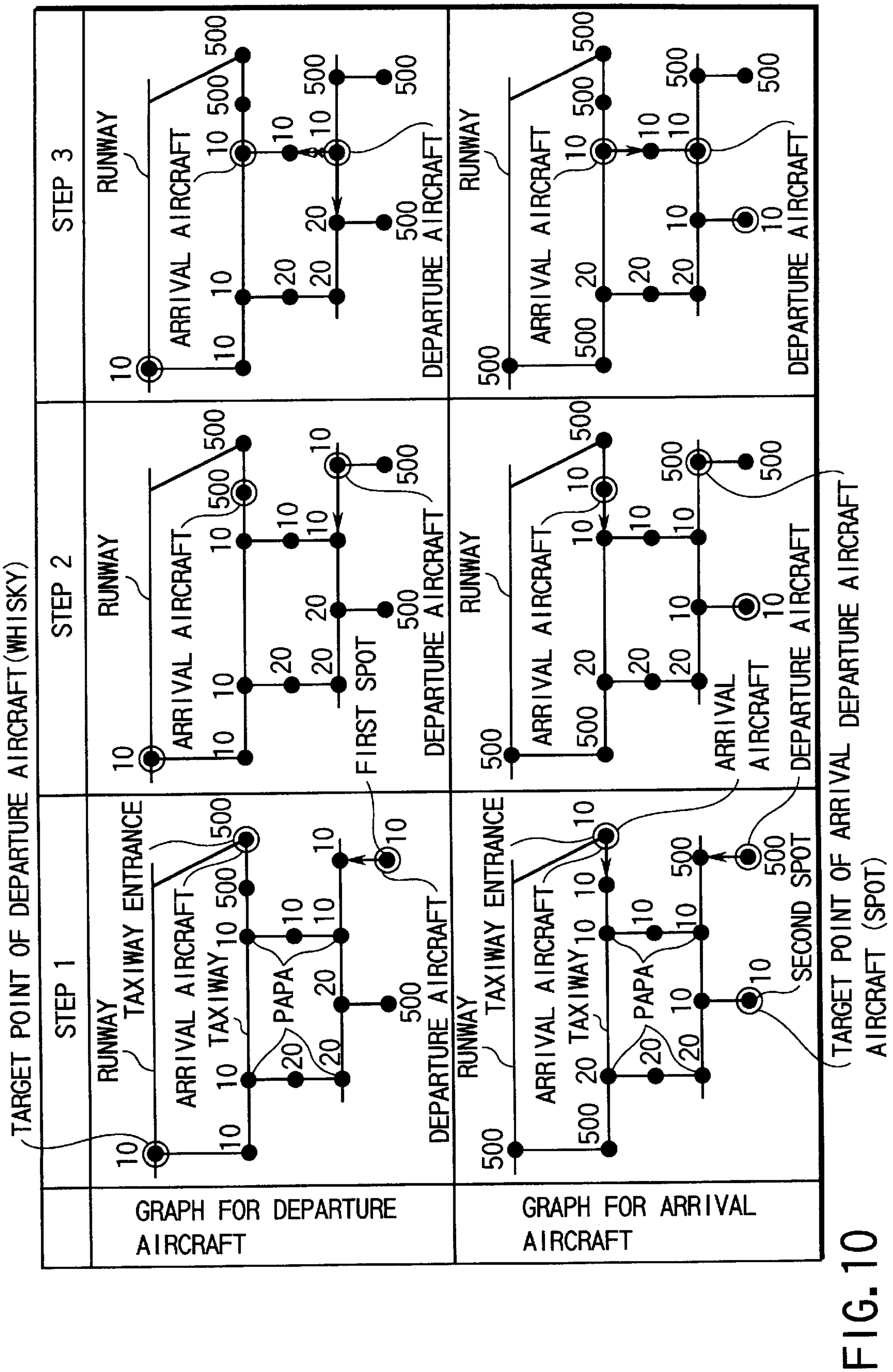
FIG. 10 is a diagram showing an example of transition of cost of the airport surface graph for a departure plane and arrival plane in the same embodiment.
Figure 11:
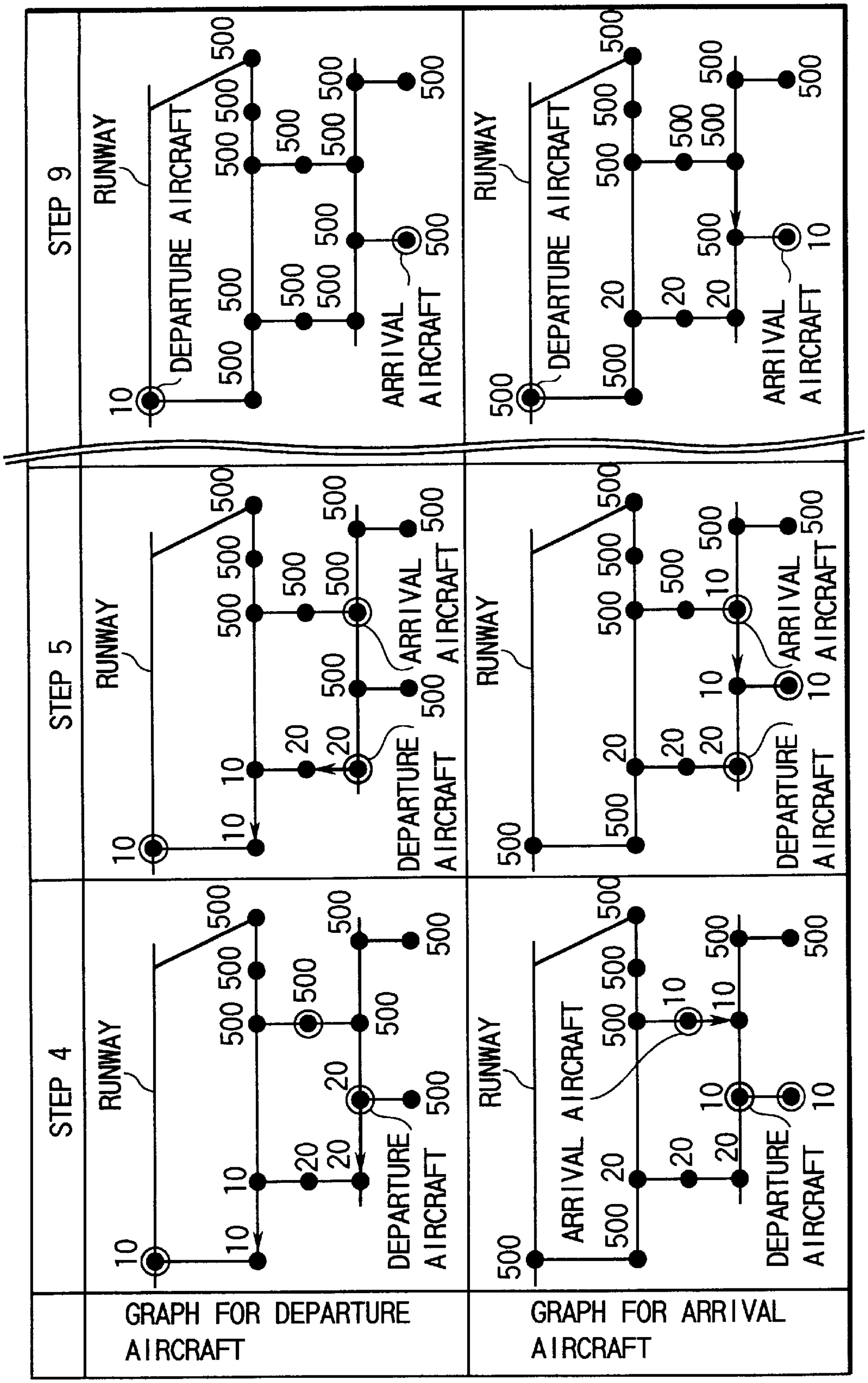
FIG. 11 is a diagram showing an example of transition of cost of the airport surface graph for a departure plane and arrival plane in the same embodiment after the case shown in FIG. 10.

As a concrete example, a case wherein the graphs of the departure aircraft and arrival aircraft are time-sequentially arranged and the aircraft take the optimum paths according to the costs is shown in FIGS. 10 and 11. FIG. 10 shows the steps 1 to 3 and FIG. 11 shows the steps 4 to 9. The numerals in the drawing show the costs. In this case, it is assumed that the departure aircraft will move from a first spot on the graph to a departure standby position and the arrival aircraft will move from the taxiway entrance position to a second spot.

As the weighting method, the presence of an obstacle (an aircraft other than the aircraft concerned is hereinafter referred to as an obstacle) is neglected and the cost of the "shortest path" for the aircraft is set to the lowest value. The shortest path is determined by the following rule. The cost determined by this method is called a "path cost".

(1) In the case of departure aircraft, it departs from Papa nearest to the present position to the taxiway.

(2) In the case of arrival aircraft, it moves from Papa nearest to the spot into an inner.

(3) By taking the weight of the aircraft into consideration, the aircraft goes into the runway from the intersection nearest to the front side.

(4) The arrival aircraft is treated preferentially to the departure aircraft (refer to the step 3 in FIG. 10).

If an obstacle is present, a cost is added according to the distance with respect to the corresponding aircraft which lies in the traveling direction of the obstacle. The cost is called an "obstacle cost". At the apex at which an obstacle is present or an apex which lies directly before the obstacle in the traveling direction thereof, the obstacle cost higher than the threshold value is added.

The width priority searching process is effected with a preset depth for individual aircraft, and when the apex having a cost higher than the threshold value is present in the depth, the presence of the apex is informed to the collision determining section B43.

If the collision determining section B43 determines that an obstacle is present near the apex, the costs of the apex for two aircraft are compared with each other and one of the aircraft which is lower in cost has priority (normally, arrival aircraft). The aircraft having the higher cost at the apex is set in the standby state or another path is selected according to the cost.

Since forward and reverse directions which are different from each other are present for the arrival aircraft and departure aircraft, a low cost is assigned to the forward direction and a high cost is assigned to the reverse direction. A cost higher than the threshold value is set to the spot of another aircraft and the landing path for the departure aircraft and the inaccessible apex such as the runway entrance for the arrival aircraft.

Figure 3:
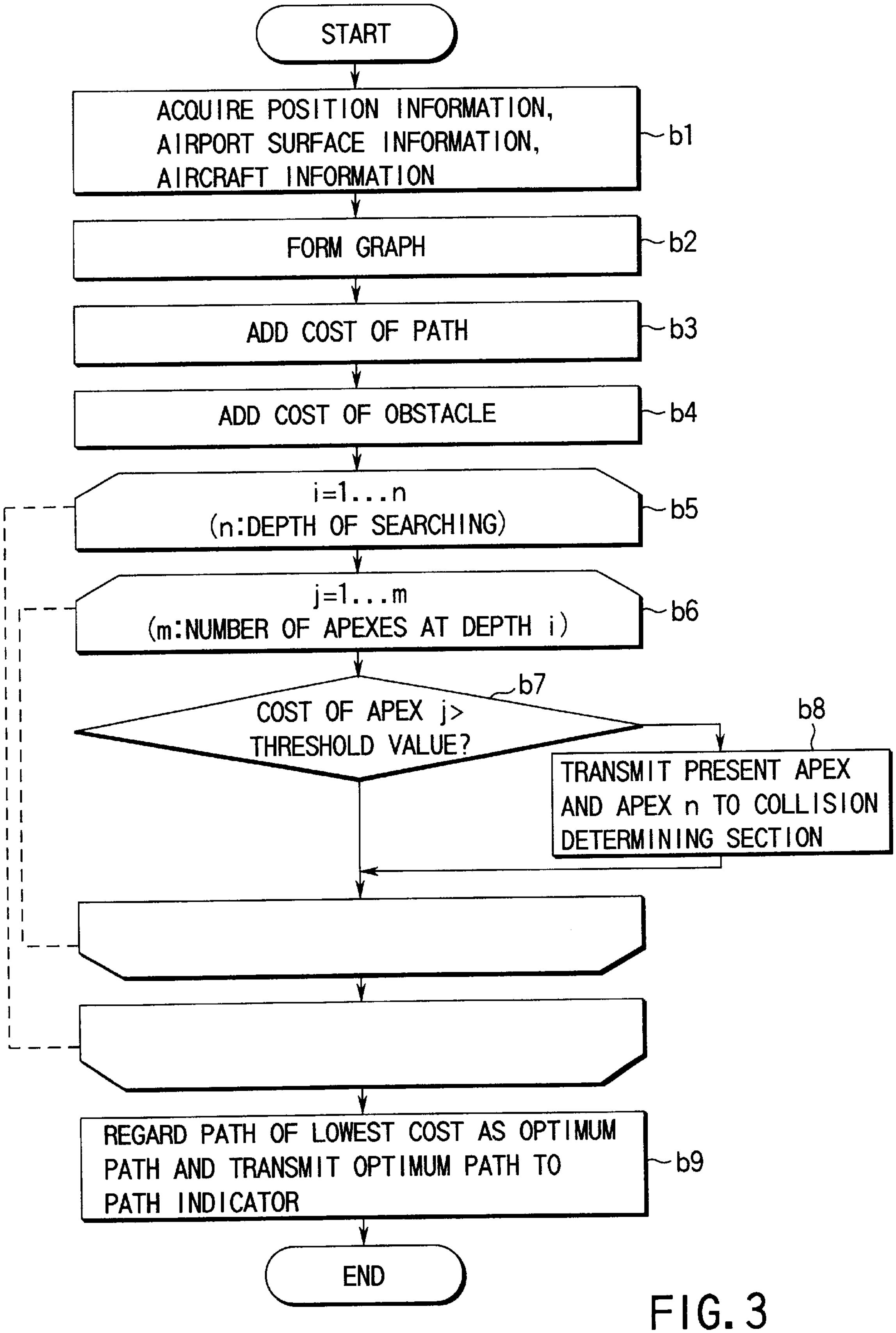
FIG. 3 is a flowchart for illustrating the process of a path determining section in the same embodiment.

The concrete process is shown in FIG. 3. In FIG. 3, first, position information, airport surface information and aircraft information are acquired (step b1), an airport surface graph is formed (step b2), path costs are added (step b3) and then obstacle costs are added (step b4).

Next, for the depth i (i=1 to n) of searching and the number j (j=1 to m) of apexes of the depth i, whether or not the cost of the apex j exceeds the threshold value (step b7) is determined and if it exceeds the threshold value, it is kept unchanged and if it does not exceed the threshold value, the present apex and the apex n are informed to the collision determining section B43 (step b8).

After the process of the steps b5 to b8 is repeatedly effected, the path of the lowest cost is treated as an optimum path and the optimum path is informed to the path indicator A31.

Next, the collision determining section B43 is explained by taking a case wherein the possibility of collision is determined by use of the cost of the graph as an example.

The function thereof is considered as follows, for example.

A certain apex of the aircraft and an apex having the cost higher than the threshold value are input via the path determining section B42, whether or not an obstacle is present near the apex is determined, and if an obstacle is present, the possibility of collision is output.

Figure 4:
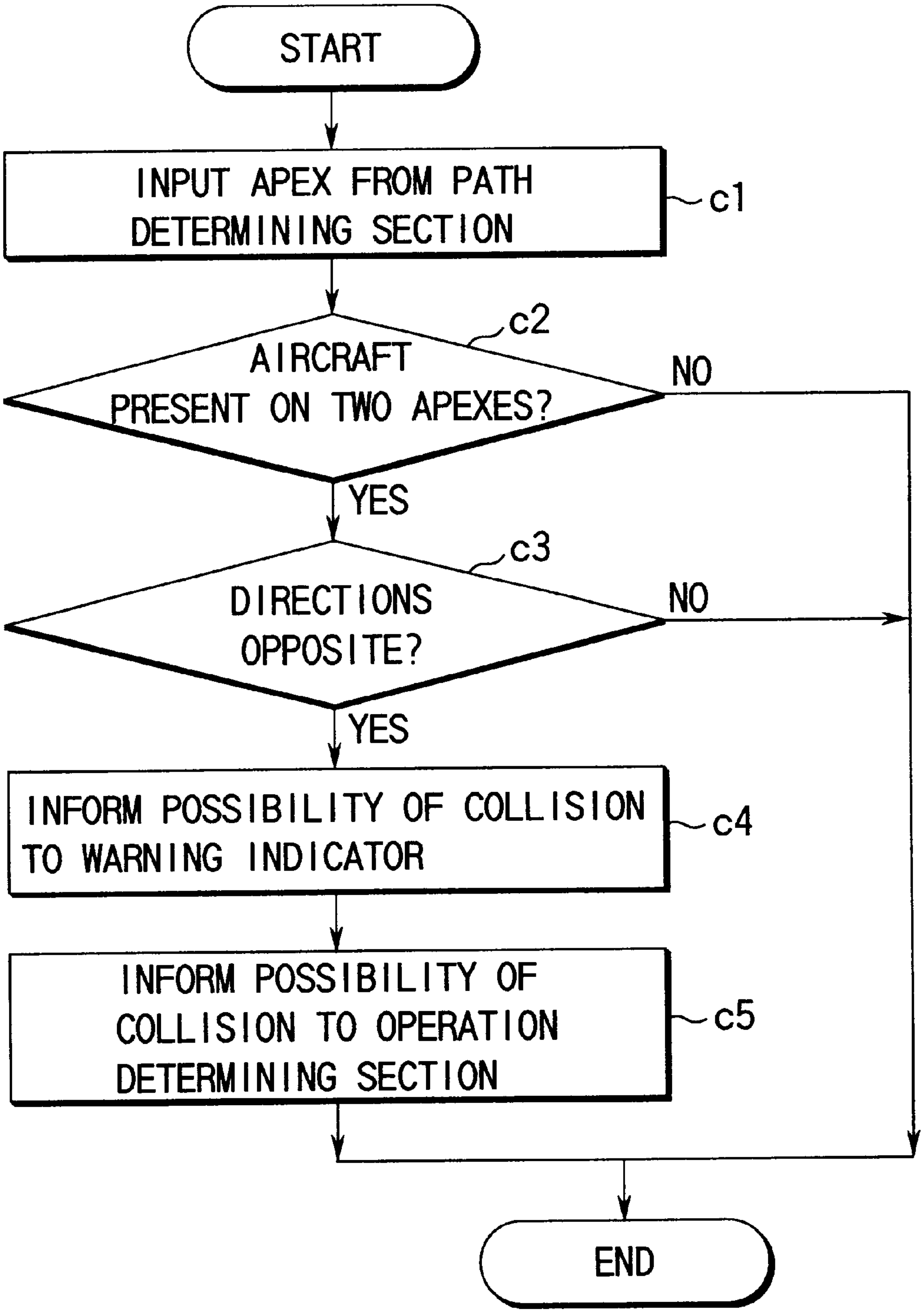
FIG. 4 is a flowchart for illustrating the process of a collision determining section in the same embodiment.

The concrete process is shown in FIG. 4. In FIG. 4, first, an apex is input from the path determining section B42 (step c1), whether or not aircraft are present on two apexes is determined (step c2), and if no aircraft is present, the "NO" process is effected. If the aircraft are present ("YES" in the step c2), whether the directions thereof are opposite or not is determined (step c3), if the directions are not opposite, the "NO" process is effected, and if the directions are opposite ("YES" in the step c3), the possibility of collision is reported to the warning indicator A32 (step c4) and the possibility of collision is reported to the control operation determining section B6 (step c5).

Next, a case wherein the control operation determining section B6 is realized by software on the computer is explained.

The function thereof is considered as follows.

As control operation information, the flight name, present position, traveling direction, and speed of the corresponding aircraft are input, maneuvering operation information and the optimum path and possibility of collision are compared, and if there is a difference, an error operation signal is transmitted and the operation is left to the automatic control section B7.

Figure 5:
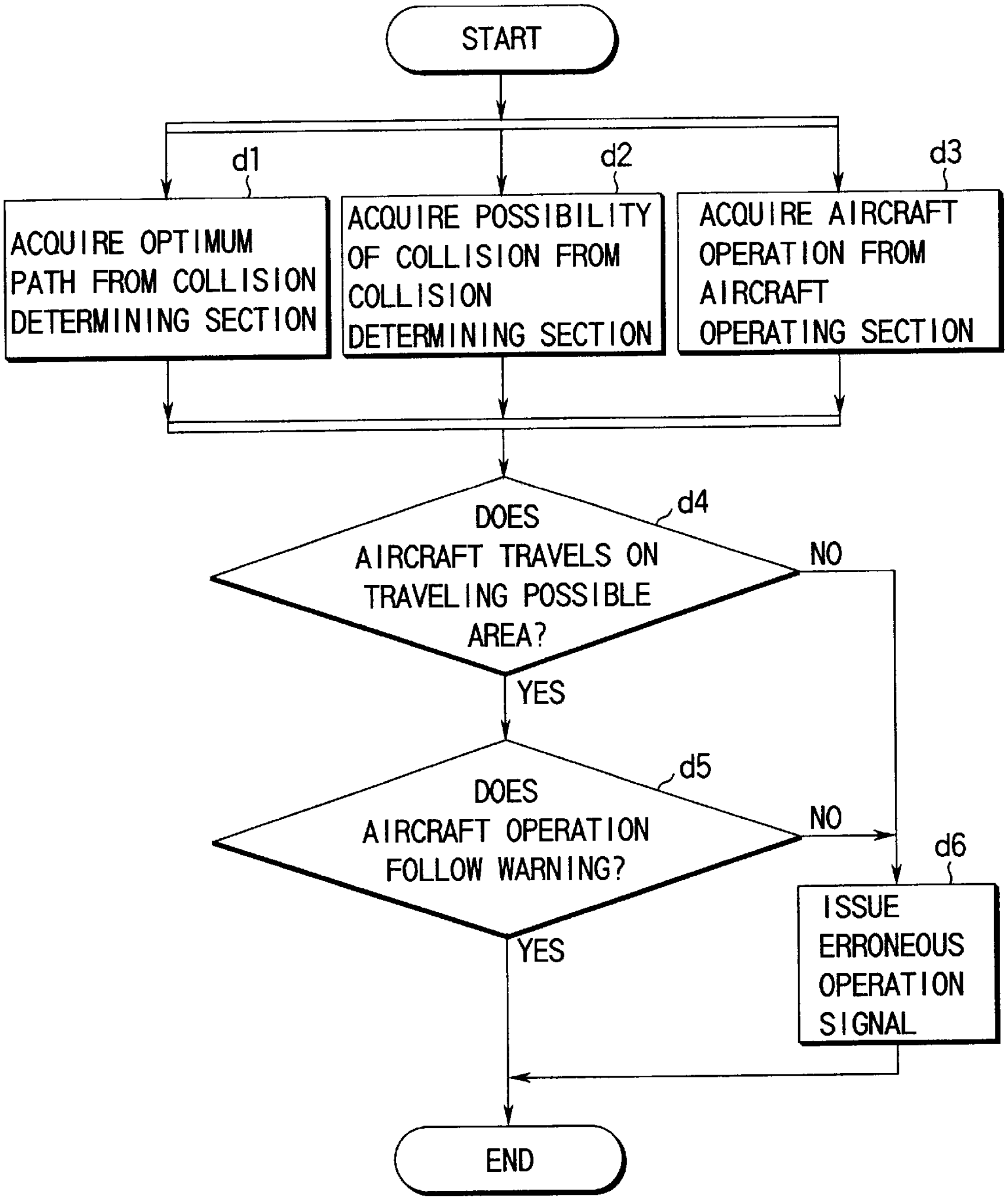
FIG. 5 is a flowchart for illustrating the process of an operation determining section in the same embodiment.

The concrete process is shown in FIG. 5. In FIG. 5, information of the optimum path is acquired from the path determining section 171 (step d1), information of the possibility of collision is acquired from the collision determining section B43 (step d2) and information of the maneuvering operation of the aircraft is acquired from the maneuvering operation control section A4 (step d3) in parallel.

Next, whether or not the aircraft travels on the traveling possible area is determined (step d4) and then whether or not the maneuvering operation of the aircraft follows the warning is determined (step d5). In this case, if the aircraft does not travel on the traveling possible area or the maneuvering operation does not follow the warning, an error operation signal is output (step d6).

Next, a case wherein the automatic control section B7 is realized by software on the computer is explained.

The function of the automatic control section B7 is considered as follows.

As the error operation signal, information on the speed of the aircraft and the distance to the obstacle is acquired, and when the error operation signal is received, a stop/deceleration command is transmitted to the maneuvering operation control section A4 according to the speed of the aircraft and the distance to the obstacle. At the same time, the content of the control command made is reported to the warning indicator A32 and is adequately displayed on the warning indicator A32 so as to cause the pilot to grasp the present situation.

Figure 6:
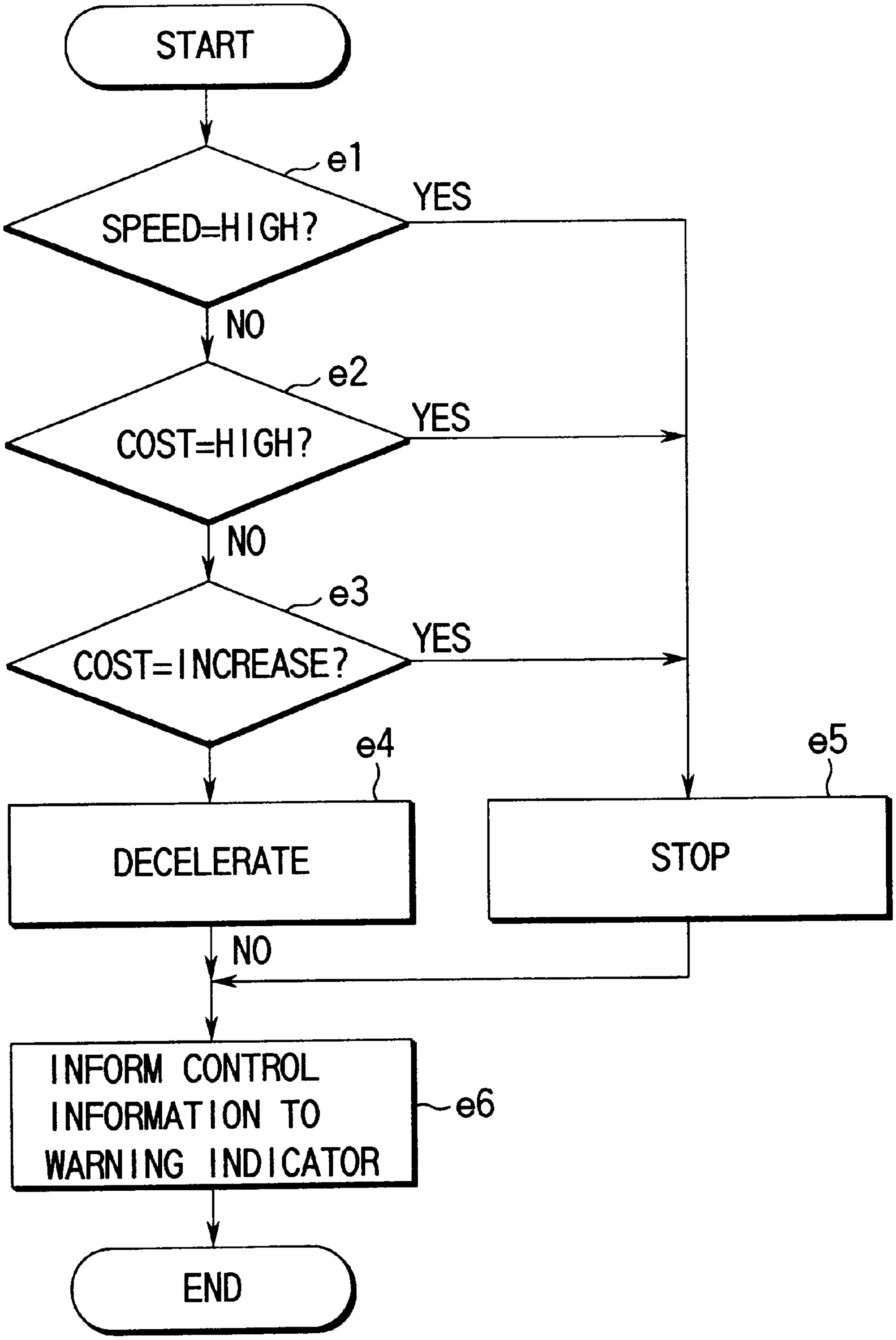
FIG. 6 is a flowchart for illustrating the process of an automatic control section in the same embodiment.
Figure 7:
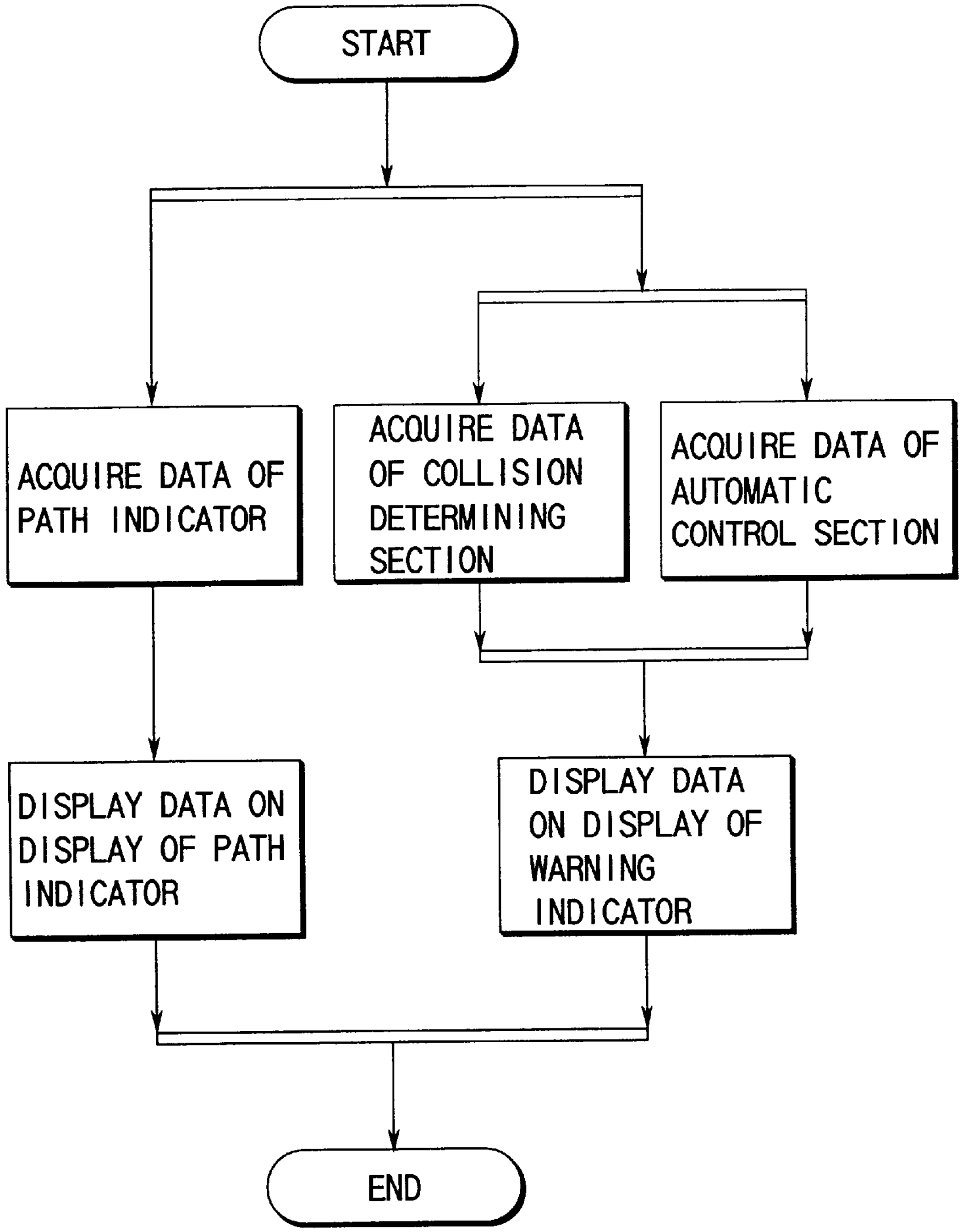
FIG. 7 is a flowchart for illustrating the process of an instruction information outputting section in the same embodiment.

The concrete process is shown in FIG. 6. In FIG. 6, first, whether or not the speed is high is determined based on the error operation signal (step e1), if the speed is not high ("NO" in the step el), whether or not the cost is high (step e2) is determined, if the cost is not high ("NO" in the step e2), whether or not the cost is increased is determined (step e3), and an instruction is issued to the maneuvering operation control section A4 to decelerate the aircraft if the cost is not increased ("NO" in the step e3).

If the speed is high, the cost is high and the cost is increased in the respective steps e1 to e3, the aircraft is stopped via the maneuvering operation control section A4 (step e5). After effecting the control operation for deceleration or stop, information indicating the control content is reported to the warning indicator A32 so as to inform the pilot that the automatic control operation has been effected (step e6).

As the output method in the instruction information output section A3, for example, it is considered that all the information is displayed on the display and a warning sound is produced from a speaker at the time of warning.

As the display content of the path indicator A31, (1) the airport surface map and the positional coordinates and directions of all of the aircraft, (2) the optimum path of the corresponding aircraft at the time of display, and (3) the traveling possible area of the corresponding aircraft are given.

Further, as the display content by the warning indicator A32, (1) the warning display of two aircraft having a possibility of collision and (2) the content of control effected for the corresponding aircraft are given. In the case of (1) an aircraft having a possibility of collision is the corresponding aircraft and the display of (2) is made, a warning sound is issued to call the pilot's attention.

Therefore, in the aerodrome control support system with the above construction, the pilot can timely give information for navigation at a good timing when he or she requires and efficiently operate the aircraft. Further, it can automatically determine that the navigation is set in the dangerous course and control the aircraft to stop or lower the speed, and as a result, the aircraft can be safely operated.

This invention is not limited to the above embodiment. For example, as the calculation method for the optimum path, a method for forming the airport surface in a graph form and effecting the searching operation on the graph is explained in the above embodiment, but the inference based on the production rule may be used. In this case, the path determining section B42 is constructed to have functions of (1) the set of production rule, (2) operation storage and (3) interpreter. The respective functions are explained with reference to FIG. 9.

(1) The set of production rule:

In an example of the production rule, if the corresponding aircraft is a departure aircraft, it travels in a forward direction in an order of spot→inner taxiway→target Papa→outer taxiway→target Whisky→runway. If the corresponding aircraft is an arrival aircraft, it travels in a forward direction in an order of runway→outer taxiway→target Papa→inner taxiway→target spot. If an obstacle is present in front of the corresponding aircraft and the traveling directions are opposite, it is stopped.

If the corresponding aircraft is a departure aircraft and is present in the inner taxiway, it goes to the outer taxiway (which is referred to as a target Papa) from Papa nearest to the present position. If the corresponding aircraft is a arrival aircraft and is present in the outer taxiway, it goes to the inner taxiway (which is referred to as a target Papa) from Papa nearest to the spot.

If an obstacle is present in Papa which the corresponding aircraft is going to enter, it stops in front of the Papa and if no obstacle is present, it goes into the Papa.

If the corresponding aircraft is an arrival aircraft and is present in the outer taxiway, it goes into the runway from the intersection nearest to the front side by taking the weight of the aircraft into consideration. If a preset period of time has not elapsed after the former aircraft took off, the corresponding aircraft waits for take-off and if the preset period of time has elapsed, it starts the takeoff.

If an aircraft is present in the runway, the corresponding aircraft waits for crossing the runway, and if no aircraft is present, it starts to cross the runway.

(2) Operation Storage:

This is a data base associated with the situation concerned and the set of facts and states is referred to as the operation storage. In the case of this system, aircraft information and map information are stored.

Further, it has factors such as the difference for the departure aircraft and arrival aircraft, the present coordinate and location (spot, inner taxiway, Papa, outer taxiway, intersection, runway), traveling direction, target Papa, target intersection (in the case of departure aircraft), target spot (in the case of arrival aircraft), and weight of the aircraft for each aircraft.

The map is represented by a set of segments (lines) and each segment has factors such as the presence or absence of the aircraft and the forward direction of the departure aircraft or arrival aircraft. Further, in this case, it is assumed that only one aircraft can be present in one segment. Papa and runway are represented by one segment and have a function of avoiding collision. Further, the runway has a function of time at which the last aircraft took off in addition to the function of the segment.

(3) Interpreter:

It selects and effects the production rule, and as the inference method, a data driving type inference method for repeatedly effecting the cycle of collation, cancellation of competition and action and positively effecting the inference and a target driving type inference method for negatively applying the production rule to check whether or not the condition necessary for attaining a given target is satisfied are considered.

For example, in the data driving type inference method, the conditional section of each production rule is collated with the operation storage section to select the production rules in which the conditional sections are satisfied. Then, one production rule which is actually executed is selected from the selected production rules to cancel the competition. Further, the action process of the selected production rule is effected.

As the process for canceling the competition, (1) a method for providing the priority and first effecting the production rule having higher priority, (2) a method for preferentially effecting a production rule which is not yet selected, (3) a method for selecting a production rule which is collated with the factors of the operation storage newly added, and (4) a method for selecting a production rule in which the conditional content is described in most detail are considered.

With the above methods, like the former optimum path calculation in the above embodiment, a path for efficiently and safely guiding the aircraft to a target point can be calculated.

As described above, according to the present invention, there is provided an aerodrome control support system which timely gives information for navigation at a good timing which the pilot requires to efficiently operate the aircraft and can automatically determine that the navigation is set in the dangerous course and safely and stably stop or lower the speed of the aircraft.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aerodrome control support system for supporting an operation of aircraft in an airport surface, comprising:

a position detector for detecting position information on all of aircraft using the airport;

an airport surface information storage section for storing airport surface information including positional information representing paths along which the aircraft are guided in the airport surface and intersections where the paths cross each other;

an aircraft information storage section for previously storing main attribute information on all of the aircraft using the airport as aircraft information, said main attribute information including weight information;

a path determining section for: obtaining information on all paths along which aircraft under control can be guided from a present position to a target position, based on a predetermined rule by selectively deriving necessary information from said position detector, said airport surface information storage section, and said aircraft information storage section; determining whether an obstacle is present or absent in said all paths; calculating costs corresponding to said all paths in consideration of whether the obstacle is present or absent in said all paths; comparing the costs with one another; and selecting and determining a lowest-cost path as an optimum path; and a path indicator for indicating the optimum path determined by said path determining section to the aircraft under control.

2. The aerodrome control support system according to claim 1, further comprising:

a collision determining section for selectively deriving necessary information from said position detector, said airport surface information storage section, and said aircraft information storage section and deriving the possibility of collision in the optimum path determined by said path determining section based on positions and traveling directions of all of the aircraft in the airport surface to ensure safety when the aircraft under control is guided; and a warning indicator for recognizing information on the possibility of collision determined by said collision determining section and issuing warning information to the aircraft under control.

3. The aerodrome control support system according to claim 2, further comprising:

a control operation determining section for monitoring a maneuvering control operation performed by the aircraft under control and referring to information on the possibility of collision determined by said collision determining section and the optimum path determined by said path determining section so as to determine whether or not the maneuvering control operation is erroneous;

an automatic control section for decelerating or stopping the aircraft under control when said control operation determining section determines that the maneuvering control operation is erroneous; and a control information display section for displaying an operation state of the aircraft under control, information input by a pilot on the aircraft under control, and information on the possibility of collision and path indicating information which are sent to the aircraft under control.

4. The aerodrome control support system according to claim 1, wherein said path determining section determines the optimum path by making a graph of the paths of the aircraft in the airport surface and the intersections of the path by using lines and points, effecting a searching operation on the graph, and assigning weight values determined in accordance with the presence or absence of the obstacle to the lines corresponding to paths searched for.

5. The aerodrome control support system according to claim 2, wherein said collision determining section receives information on the position and traveling direction of the aircraft under control and on the position and traveling direction of aircraft which becomes an obstacle to passage of the aircraft under control, derives the distance between the two aircraft and determines a strong possibility of collision when the distance is shorter than a reference value and the traveling directions thereof are opposite.

6. The aerodrome control support system according to claim 4, wherein said collision determining section determines a possibility of collision based on the cost corresponding to the paths on the graph created by said path determining section.

7. The aerodrome control support system according to claim 2, further comprising a request information input section for inputting an instruction request associated with guidance of the airport surface from aircraft in the airport surface, and in which said path determining section, said collision determining section and said path indicator provide information on the optimum path and the possibility of collision in response to said request from said request information inputting section.

8. The aerodrome control support system according to claim 2, further comprising:

a knowledge information storage section for storing knowledge information required for a determination made by said collision determining section; and a knowledge input section for inputting said knowledge information into said knowledge information storage section.

* * * * *